United States Patent
Mayo et al.

[11] Patent Number: 5,897,695
[45] Date of Patent: Apr. 27, 1999

[54] INK COMPOSITIONS

[75] Inventors: James D. Mayo; Marcel P. Breton, both of Mississauga; Stephan V. Drappel, Toronto; Patricia A. Burns, Milton, all of Canada

[73] Assignee: Xerox Corporation, Stamford, Conn.

[21] Appl. No.: 08/922,434

[22] Filed: Sep. 2, 1997

[51] Int. Cl.[6] .................................................. C09D 11/02
[52] U.S. Cl. ...................................... 106/31.75; 106/31.86
[58] Field of Search ............................. 106/31.43, 31.58, 106/31.75, 31.86

[56] References Cited

U.S. PATENT DOCUMENTS

| | | | |
|---|---|---|---|
| 4,251,824 | 2/1981 | Hara et al. | 346/140 R |
| 4,410,899 | 10/1983 | Haruta et al. | 346/140 R |
| 4,601,777 | 7/1986 | Hawkins et al. | 156/626 |
| 4,705,567 | 11/1987 | Hair et al. | 106/31.43 |
| 4,877,451 | 10/1989 | Winnik et al. | 106/31.27 |
| 5,080,716 | 1/1992 | Aoki et al. | 106/31.75 |
| 5,120,361 | 6/1992 | Winnik et al. | 106/31.27 |
| 5,125,968 | 6/1992 | Takimoto et al. | 106/31.75 |
| 5,131,949 | 7/1992 | Tochihara et al. | 106/31.75 |
| 5,145,518 | 9/1992 | Winnik et al. | 106/31.33 |
| 5,173,112 | 12/1992 | Matrick et al. | 160/31.75 |
| 5,254,159 | 10/1993 | Gundlach et al. | 106/31.43 |
| 5,256,193 | 10/1993 | Winnik et al. | 106/31.27 |
| 5,271,764 | 12/1993 | Winnik et al. | 106/31.27 |
| 5,354,369 | 10/1994 | Shimomura et al. | 106/31.75 |
| 5,370,731 | 12/1994 | Yamashita et al. | 106/31.75 |
| 5,389,134 | 2/1995 | Breton et al. | 106/31.75 |
| 5,421,868 | 6/1995 | Ayalia-Esquilin et al. | 106/31.75 |
| 5,431,722 | 7/1995 | Yamashita et al. | 106/31.75 |
| 5,462,590 | 10/1995 | Yui et al. | 106/31.75 |
| 5,482,548 | 1/1996 | Stirling et al. | 106/31.75 |
| 5,686,508 | 11/1997 | Shimomura et al. | 106/31.75 |
| 5,693,126 | 12/1997 | Ito | 106/31.75 |
| 5,728,206 | 3/1998 | Badejo | 106/31.75 |

*Primary Examiner*—Helene Klemanski
*Attorney, Agent, or Firm*—E. O. Palazzo

[57] ABSTRACT

An ink composition comprised of a vehicle, colorant, and associated with said colorant a primary amine, a secondary amine, or a tertiary amine.

15 Claims, No Drawings

INK COMPOSITIONS

BACKGROUND OF THE INVENTION

The present invention is directed to ink compositions, and imaging and printing processes thereof. More specifically, in embodiments the present invention is directed to ink jet ink compositions with improved waterfastness characteristics, and desirable viscosities, and which inks are useful for printing on a variety of substrates, such as paper, and wherein the inks contain colorants, especially pigments, such as carbon black, especially acidic carbon blacks, with associated primary, secondary, and/or tertiary amine complexing components. The inks can be formulated by, for example, adding the amine and carbon black to water, and wherein there is formed a weak network of interaction between the carbon black particles and the amine. The inks of the present invention in embodiments possess an initial high viscosity, for example from about 20 to about 500 centipoise, and a low viscosity when subjected to shearing forces, for example after being ejected from an ink jet head, which low viscosity is, for example, from about 1 to about 10 centipoise, and more specifically, from about 2 to about 5 centipoise (cps), and subsequently, an important return to high viscosity upon removal of the shear forces, for example, once the ink rests on the substrate surface, which viscosity is from about 20 to about 500 centipoise, thereby enabling excellent jettability and excellent image resolution. Of importance with respect to the present invention is the enablement of inks with a high viscosity after shearing, as compared to similar prior art inks with dyes, reference for example U.S. Pat. No. 5,254,159, the disclosure of which is totally incorporated herein by reference, and wherein inks with dyes with amines are disclosed, and which inks are very nonviscous after shearing; for example these inks possess a low viscosity of from about 2 to about 5, thus the image resolution and other image and ink characteristics are inferior when compared to the pigmented inks and developed images thereof of the present invention. Viscosity and surface tensions are important contributing factors in the generation of excellent quality prints on plain papers, that is prints with acceptable edge acuity, or the sharpness of the edge between the printed and nonprinted areas, minimal ink feathering on paper, and characterized, for example, by a desirable uniformity of solid area ink coverage.

The inks of the present invention can be selected for a number of known ink jet printing methods and apparatus, including thermal ink jet, or bubble jet processes as described in, for example, U.S. Pat. No. 4,601,777, U.S. Pat. No. 4,251,824, U.S. Pat. No. 4,410,899, U.S. Pat. No. 4,412,224, and U.S. Pat No. 4,532,530, the disclosures of which are totally incorporated herein by reference, acoustic ink jet processes, reference U.S. Pat. No. 5,688,312, U.S. Pat. No. 5,667,568, U.S. Pat. No. 5,700,316, U.S. Pat. No. 5,747,554, and copending patent application U.S. Ser. No. 641,866, the disclosures of each of the aforementioned patent applications being totally incorporated herein by reference. Many of the components, such as the vehicles, additives, pigments, and the like of the aforementioned copending applications may be selected for the inks of the present invention in embodiments thereof. Rapid drying and excellent, or superior waterfastness, in embodiments of the present invention of from between about 90 to about 99 percent, greater than 95 percent, and more specifically, from about 95 to about 99.5 percent, are of value in rapid printing applications, such as printing by xerography at, for example, a speed of from about 50 to about 100 copies per minutes. Also, in embodiments the inks of the present invention possess water staining resistance.

PRIOR ART

Ink jet printing systems can generally be classified as continuous stream and drop-on-demand. In drop-on-demand systems, a droplet is ejected from an orifice directly to a position on a recording medium in accordance with digital data signals. A droplet is not usually formed or expelled unless it is to be placed on the recording medium. A second type of drop-on-demand system is known as thermal ink jet, or bubble jet, wherein there are apparently generated high velocity droplets and there is permitted very close spacing of the nozzles. Thermal ink jet processes are described, for example, in U.S. Pat. Nos. 4,601,777; 4,251,824; 4,410,899; 4,412,224 and 4,532,530, the disclosures of each of which are totally incorporated herein by reference.

Ink jet inks generally comprise a water soluble dye which is soluble in an ink vehicle such as water or a mixture of water and a known water soluble or water miscible organic solvent. Inks comprising these soluble dyes may exhibit many problems, such as poor waterfastness, poor lightfastness, clogging of the jetting channels primarily as a result of solvent evaporation and changes in the solubility of the dye, dye crystallization, ink bleeding when prints are formed on plain papers, poor thermal stability, chemical instability, ease of oxidation, and low drop velocity. In addition, many of these known dyes contained in inks may be potentially toxic or mutagenic. Moreover, as indicated herein the inks with dyes and amines, reference U.S. Pat. No. 5,254,159, possess undesirable viscosities, such as low initial viscosities. These problems may be minimized by replacing the dyes used in ink formulations with insoluble pigments. Although not being desired to be limited by theory, it is believed in embodiments of the present invention that the improvement in latency, viscosities, and the like can be achieved by a complexation between the pigment and the amine. Also, inks with the pigments of the present invention are superior to dyes with respect to waterfastness, lightfastness, image density, thermal stability, oxidative stability, compatibility with both coated and treated plain papers, image edge acuity, viscosity after shearing, and nontoxic and nonmutagenic properties.

Heterophase ink jet inks are known. For example, U.S. Pat. No. 4,705,567, the disclosure of which is totally incorporated herein by reference, illustrates a heterophase ink jet ink composition which comprises water and a dye covalently attached to a component selected from the group consisting of poly(ethylene glycols) and poly(ethylene imines), which component is complexed with a heteropolyanion. In addition, U.S. Pat. No. 4,597,794 discloses an ink jet recording process which comprises forming droplets of an ink and recording on an image receiving material by using the droplets, wherein the ink is prepared by dispersing fine particles of a pigment into an aqueous dispersion medium containing a polymer with both a hydrophilic and a hydrophobic portion.

U.S. Pat. No. 4,877,451, the disclosure of which is totally incorporated herein by reference, illustrates ink jet ink compositions with water, a solvent, and a plurality of colored particles comprising hydrophilic porous silica particles, to the surfaces of which dyes are covalently bonded through silane coupling agents. The ink compositions of this patent are believed to be less stable in the printheads, and less stable during storage, disadvantages avoided, or minimized with the inks of the present invention.

In U.S. Pat. No. 5,120,361, the disclosure of which is totally incorporated herein by reference, there is disclosed an ink composition comprised of a solution comprised of a dendrimer and a dye or dyes, which dyes are visible, or can be seen under normal viewing conditions, and wherein the dendrimer can be a first, second or third generation dendrimer.

In U.S. Pat. No. 5,256,193, there are illustrated ink jet inks comprised of an aqueous liquid vehicle comprised of certain dyes and dendrimers. In one embodiment, the inks are comprised of a solution comprised of a porphyrin type dye and a dendrimer.

In U.S. Pat. No. 5,145,518, there is disclosed an ink composition which comprises an aqueous liquid vehicle and particles of an average diameter of 100 nanometers or less which comprise micelles of block copolymers of the formula ABA, wherein A represents a hydrophilic segment and B represents a hydrophobic segment, and wherein dye molecules are covalently attached to the micelles, the dye molecules being detectable when exposed to radiation outside the visible wavelength range; and in U.S. Pat. No. 5,271,764, there is disclosed an ink composition comprised of a solution comprised of a dye comprised of a porphyrin chromophore.

The disclosures of each of the patents are totally incorporated herein by reference.

SUMMARY OF THE INVENTION

It is an object of the present invention to provide ink compositions with many of the advantages illustrated herein.

It is another object of the present invention to provide ink jet compositions with certain pigments having associated therewith amines, and which inks possess high viscosities prior to shearing, low viscosity during shearing, and a rapid return to high viscosity after shearing.

Another object of the present invention is to provide rapid drying ink compositions, drying, for example, in less than about one minute on plain papers.

Yet another object of the present invention is to provide ink compositions that can be prepared by simple and economical processes.

It is another object of the present invention to provide ink compositions suitable for printing on plain papers, coated or treated papers, and transparencies.

It is still another object of the present invention to provide in embodiments ink compositions with water staining resistance.

Another object of the present invention is to provide ink compositions with acceptable thermal and storage stability.

Moreover, another object of the present invention is to provide ink compositions suitable for ink jet printing, which inks do not induce or minimize clogging of the ink printheads.

Embodiments of the present invention include providing an ink composition comprised of a liquid, preferably water, and a pigment, such as carbon black associated with an amine. The associated pigment can be prepared by, for example, adding a complexing amine, for example a primary amine, a secondary amine, a tertiary amine, or mixtures thereof to a pigment, especially an acidic carbon black, and heating, followed by cooling, and wherein there is created between the pigment, such as carbon black, and the amine a weak interaction network, that is for example wherein the carbon black and the amine are associated and are not believed to be covalently bonded. The invention inks possess, for example, a high viscosity, for example from about 20 to about 500 centipoise prior to shearing, a low viscosity during shearing, for example from about 2 to about 5 centipoise, and a high viscosity after shearing, for example greater than 20, preferably greater than 40, and more specifically, from about 20 to about 500 centipoise, and wherein the inks possess improved waterfastness and excellent wet smear characteristics, increased optical density, a unique rheology enabling inks with a high viscosity at low shear and a low viscosity at high shear, and the like.

Embodiments of the present invention include an ink composition comprised of a vehicle, pigment, and associated with said pigment a primary amine, a secondary amine, or a tertiary amine; an ink composition comprised of a vehicle, an acidic pigment, and associated with said pigment, a primary amine, a secondary amine, or a tertiary amine, and which ink possesses a high viscosity prior to shearing, a low viscosity during shearing, and a high viscosity after shearing; an ink wherein said high viscosity is from about 20 to about 500 centipoise, and said low viscosity is from about 1 to about 10 centipoise, said vehicle is water, said pigment is carbon black; an ink wherein said amine is N,N'-bis (aminopropyl)ethylene diamine, or wherein said amine is N-bis(aminopropyl)ethylene diamine; an ink wherein said high is from about 50 to about 300 centipoise and said low is from about 2 to about 5 centipoise; an ink further containing ink additives; an ink wherein said ink additives are selected from the group consisting of a humectant, a biocide, and mixtures thereof, each present in an amount of form about 1 to about 50 weight percent; an ink wherein the humectant is a glycol; an ink wherein the pigment is present in an amount of about 1 to about 10 parts, or percent by weight; an ink wherein the water is present in an amount of from about 75 to about 99.5 parts, or percent by weight; an ink wherein the humectant is a glycol selected from the group consisting of ethylene glycol, propylene glycol, diethylene glycol, and mixtures thereof; an ink further containing a biocide present in the amount of from about 0.02 to about 0.1 percent by weight; an ink wherein said amine is N,N'-bis(3-aminopropyl)ethylene diamine, or N-bis(3-aminopropyl)ethylene diamine present in an amount of from about 0.01 to about 50, and preferably from 0.1 to about 5 weight percent of said carbon black; an ink wherein said amine is N,N'-bis(3-aminopropyl)ethylene diamine, or N-bis(3-aminopropyl)ethylene diamine present in an amount of from about 0.01 to about 50 weight percent, and the pH of said ink is from about 8.2 to about 9.5; an ink wherein said high viscosity is from about 5 to about 200 centipoise measured at a shear rate of about 25 sec$^{-1}$, said low viscosity is from about 1 to about 10 centipoise during shearing at about 150 sec$^{-1}$, and said high viscosity is from about 5 centipoise to about 200 centipoise after shearing, and optionally, wherein said pH of the ink is from about 8.8 to about 9.2; an ink wherein said pigment pH is from about 4 to about 8; a printing process which comprises (1) incorporating into an ink jet printing apparatus the ink composition of the present invention, and (2) causing droplets of the ink to be ejected in an imagewise pattern onto a substrate, thereby generating images on the substrate; a printing process wherein the ink jet printing apparatus employs a thermal ink jet printing process, and wherein there are provided prints on paper with solid area coverage with an optical density of from about 0.5 to about 1.5, and a waterfastness of from about 90 percent to about 100 percent and a process which comprises (a) providing an acoustic ink printer having a pool of the invention with a free surface, and a printhead including at least one droplet ejector for radiating the free surface of said ink with focused acoustic radiation to eject individual droplets of ink therefrom on demand, said radiation being brought to focus with a finite waist diameter in a focal plane.

Moreover, the present invention relates to the process which comprises providing an acoustic ink printer having a pool of an ink comprised of a vehicle, colorant, and associated with the colorant a primary and secondary amino or tertiary amine, with a free surface and a printhead including at least one droplet ejector for radiating the free surface of said ink with focused acoustic radiation to eject individual droplets of ink therefrom on demand, said radiation being brought to focus with a finite waist diameter in a focal plane, and wherein the ink possesses high viscosity of greater than, or equal to about 40 centipoise prior to shearing, and high viscosity of from about 1 to 10 centipoise during shearing, and a high viscosity of greater than or equal to about 40 centipoise after shearing.

The liquid vehicle for the inks of the present invention can be comprised of various known suitable components, such as water, a mixture of water and a miscible organic component, such as a glycol, like ethylene glycol, propylene glycol, diethylene glycols, glycerine, dipropylene glycols, polyethylene glycols, polypropylene glycols, and the like; amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones; other water miscible components, mixtures thereof; and the like. When mixtures of water and water miscible organic liquids, such as glycols, are selected as the liquid vehicle, the water to organic ratio may be in any effective range, and typically is from about 100:0 to about 30:70, and preferably from about 97:3 to about 50:50. The nonwater or organic component of the liquid vehicle generally serves as a humectant, and usually has a boiling point higher than that of water (100° C.). With the inks of the present invention, in embodiments the liquid vehicle can be present in various suitable amounts, such as for example, from about 50 to about 99.5 percent by weight, (or parts throughout) and preferably from about 75 to about 99 percent by weight, and wherein the total of the ink components is about 100 parts, or 100 percent.

Examples of amines that may be selected include N-bis (aminopropyl)ethylene diamine, N,N'-bis(3-aminopropyl) ethylene diamine, N,N'-bis(3-aminopropyl)-1,2-ethylene diamine, 1,4-bis(3-aminopropyl)piperazine, N,N'-bis(3-aminopropyl)-1,3-propane diamine, N,N'-bis(3-aminopropyl)-1,4-butane diamine, ethylenediamine, diethylenetetramine, triethylenetetramine, tetraethylenepentamine, nitrilotrisethylamine, N,N'-(diaminoethyl)piperazine, piperazinylethylethylene diamine, aminoethyltriethylenetetramine, aminoethylpiperazinylethylethylene diamine, piperazinylethyidiethylenetetramine, pentaethylenehexamine, and mixtures thereof. In embodiments of the present invention, the amines such as N,N'-bis (3-aminopropyl)ethylene diamine are selected in various effective amounts ranging, for example, from about 0.01 percent to about 50 percent, and preferably from about 0.1 to about 5 percent of the weight of the pigment that is used. Mixtures of amines may also be selected and which mixtures contain, for example, a first, a second, and a third amine, each present in a suitable effective amount, and wherein the total thereof is about 100 percent, or parts.

Specific examples of carbon black pigments, preferably dispersions thereof include those available from Cabot Corporation, such as carbon black CSX440L having a pH of 7.8, a surface tension of 74 dynes/cm, and a particle size of approximately 100 nanometers. Other examples of carbon black dispersions include Cab-O-Jet 200, and Cab-O-Jet 300, both available from Cabot Corporation, Levanyl Black AS-F, available from Bayer, Flexiverse Black, available from Sun Chemical, Black dispersions available from RBH Dispersions Inc., and the like. Carbon black pigments can also be selected, such as for example, the Raven series carbon blacks available from Columbian Chemical Corporation, and the Regal series of carbon blacks, available from Cabot Corporation. The pigment is present in the ink in various effective amounts, for example from about 1 to about 25, and more specifically, from about 2 to about 8 weight percent. Suitable pigments other than carbon black may also be selected in embodiments of the present invention.

Optional additives can also be present in the inks of the present invention, such as for example, one or more surfactants or wetting or dispersing agents can be added to the ink. These additives may be of the cationic, anionic, amphoteric, or nonionic types. Suitable surfactants and wetting or dispersing agents include TAMOL® SN, TAMOL® LG, available from Rhom and Haas, those of the TRITON® series available from Rohm and Haas Company, those of the MARASPERSE® series, and those of the IGEPAL® series available from GAF Company, those of the TERGITOL® series, and STRODEX PK-90Tm available from GAF, PLURONIC F-68™ available from BASF, KARASPERSE TUTM available from Marasperse, and other commercially available surfactants. These surfactants and wetting agents can be present in any effective amounts, generally from 0 to about 15 percent by weight, and preferably from about 0.01 to about 8 percent by weight.

Polymeric additives or dispersants in suitable amounts of, for example, about 1 to about 15, or from about 1 to about 5 weight percent for further enhancing the viscosity of the ink can also be added to the inks of the present invention. Examples include water soluble polymers, such as gum arabic, polyacrylate salts, polymethacrylate salts, polyvinyl alcohols, hydroxypropylcellulose, hydroxyethylcellulose, polyvinylpyrrolidinone, polyvinylether, starch, polysaccharides, the sodium salt of naphthalene sulfonate formaldehyde copolymer, the sodium salt of alkylbenzene sulfonate, the sodium salt of dialkylsulfosuccinate, the sodium salt of lignosulfonate, sodium alkylene oxide copolymer, the sodium salt of alkyletherphosphate, and the like. In addition, polymers such as hydroxypropylpolyethyleneimine (HPPEI-200) or other polyethyleneimine derivatives can be added to the ink.

Additional optional ink additives for further improving the jetting characteristics and the storage stability of the inks, and for preventing undesirable interactions of the inks with the printhead either during the jetting process or while the printer is idle, include humectants such as ethylene glycol, diethylene glycol, N-methylpyrrolidinone, 2-pyrrolidinone, propylene glycol, hydroxyethers, ethers, amides, sulfoxides, ketones, lactones, esters, alcohols, and the like, present in an amount of from 0 to about 50 percent by weight, and preferably from about 5 to about 40 percent by weight; biocides like DOWICIL™ 75, 150, and 200, benzoate salts, sorbate salts, and the like, each present in an effective amount of, for example, from about 0.0001 to about 4 percent by weight, and preferably from about 0.01 to about 2.0 percent by weight; and pH controlling agents, such as acids or bases, phosphate salts, carboxylate salts, sulfite salts, amine salts, and the like, present in an amount of from 0 to about 5 percent by weight and preferably from about 0.01 to about 2 percent by weight, and bases preferably present in an amount of from 0 to about 10 percent by weight and more preferably from about 4 to about 8 percent by weight.

The ink compositions of the present invention are suitable for use in a number of ink jet printing processes such as continuous stream, piezoelectric drop-on-demand, bubble jet, acoustic ink jet, or thermal ink jet processes. Generally, one ink jet process comprises incorporating an ink of the present invention into an ink jet printing apparatus and causing droplets of the ink to be ejected in an imagewise pattern onto a suitable substrate, thereby generating images on the substrate. Various known ink jet apparatus may be employed to generate images with the ink compositions disclosed herein, such as the DIABLO C150 IJ™ printer, the Hewlett Packard DESK JET™ printers, the DIABLO C150 TIJ™ printer, or the like. Particularly preferred is a thermal ink jet printing apparatus. The inks of the present invention can be used to form images on a wide variety of substrates, including plain paper such as Xerox 4024 paper, bond paper such as GILBERT® 25 percent cotton bond paper or GILBERT® 100 percent cotton bond paper, silica coated papers, transparency materials, fabrics, plastics, polymeric films, and the like.

The ink compositions of the present invention can be prepared by various suitable processes. Typically, the inks are prepared by simple mixing of the components. One process embodiment involves mixing all of the ink ingredients together and filtering the mixture to obtain an ink. Optionally, the mixture obtained after mixing all the ingredients, or components can be heated to a temperature of from about 40° C. to about 55° C. for a period of time, for example from about 2 to about 3 hours, subsequently cooling the mixture to room temperature (typically from about 10° C. to about 35° C.) and filtering the mixture to obtain the desired ink.

Specific embodiments of the invention will now be described in detail. These Examples are intended to be illustrative, and the invention is not limited to the materials, conditions, or process parameters set forth in these embodiments. All parts and percentages are by weight unless otherwise indicated. Comparative data is also provided.

EXAMPLE I
(27039-66-3) ([N-Baped]=0.05 Weight Percent):

A total of 50 milliliters of ink were prepared by mixing in a 100 milliliter glass bottle 12.5 grams of a 20 percent by weight carbon black dispersion (carbon black pH=7.8), and which dispersion is available from Cabot Corporation under the tradename CSX-440L™; 0.025 gram of poly(ethylene glycol), $M_w$=18.5K, (18,500) available from Polysciences; 0.05 gram of N-lauroyl sarcosine available from Sigma Chemicals Company; 2.5 grams of a premixed Trizma buffer (pH=8.5) available from Sigma Chemicals Company; 4.38 grams of ethyleneglycol available from Aldrich; 4.38 grams of diethyleneglycol available from Aldrich; 0.025 gram of N,N'-bis(3-aminopropyl ethylenediamine (N-Baped); and 26.15 grams of deionized water. The pH of the ink was then adjusted to 9.00+/-0.02 by the addition of dilute (3M) hydrochloric acid. The viscosity of this ink is reported in Table 1. This ink was printed on an HP 850C printer (black cartridge) and provided images of 1.5 optical density on Image Series LX and Xerox 4024DP papers. The images were found to be about 95 percent wateriest, using the measurement technique described herein.

Waterfastness was measured by submerging a solid area printed image in tap water at room temperature, about 22° C., for a period of five minutes, during which time the water was stirred gently at a rate of about 10 rpm. The print was then allowed to dry in air. Waterfastness is the ratio of the optical density of the image after soaking to its initial optical density before soaking. Prints were aged for 24 hours at room temperature, about 25° C., prior to conducting this measurement.

EXAMPLE II
(27039-66-1) ([N-Baped]=0.1 Weight Percent):

A total of 50 milliliters of ink was prepared by mixing in a 100 milliliter glass bottle 12.5 grams of a 20 percent by weight dispersion of carbon black with a pH of 7.8 and available from Cabot Corporation under the tradename CSX-440L™; 0.025 gram of poly(ethylene glycol), $M_w$=18.5K, available from Polysciences; 0.05 gram of N-lauroyl sarcosine available from Sigma Chemicals Company; 2.5 grams of a pre-mixed Trizma buffer (pH=8.5) available from Sigma Chemicals Company; 4.38 grams of ethyleneglycol available from Aldrich; 4.38 grams of diethyleneglycol available from Aldrich; 0.05 gram of N,N'-bis(3-aminopropyl ethylenediamine; and 26.13 grams of deionized water. The pH of the ink was then adjusted to 9.00+/-0.02 by the addition of dilute (3M) hydrochloric acid. The viscosity of this ink is reported in Table 1. This ink was printed on an HP 850C printer (black cartridge) to provide images of 1.5 optical density on Image Series LX and Xerox 4024DP papers. The images were found to be about 95 percent waterfast, using the measurement technique described in Example I.

EXAMPLE III
(27039-64-3) ([N-Baped =0.25 Percent):

A total of 50 milliliters of ink was prepared by mixing in a 100 milliliter glass bottle 12.5 grams of a 20 percent by weight carbon black (pH=7.8) dispersion available from Cabot Corporation and available under the tradename CSX-440L™; 0.025 gram of poly(ethylene glycol), $M_w$=18.5K, available from Polysciences; 0.05 gram of N-lauroyl sarcosine available from Sigma Chemicals Company; 2.5 grams of a premixed Trizma buffer (pH=8.5) available from Sigma Chemicals Company; 6.25 grams of ethyleneglycol available from Aldrich; 6.25 grams of diethyleneglycol available from Aldrich; 0.125 gram of N,N'-bis(3-aminopropyl ethylenediamine; and 21.87 grams of deionized water. The pH of the ink was then adjusted to 9.00+/-0.02 by the addition of dilute (3M) hydrochloric acid. The viscosity of this ink is reported in Table 1. This ink was printed on an HP 850C printer (black cartridge) to provide images of 1.5 optical density on Image Series LX and Xerox 4024DP papers. The images were found to be about 95 percent waterfast, using the measurement technique described in Example I.

EXAMPLE IV
(27039-64-6) ([N-Baped=0.5 Percent):

A total of 50 milliliters of ink was prepared by mixing in a 100 milliliter glass bottle 12.5 grams of a 20 percent by weight carbon black having (pH=7.8) dispersion available from Cabot Corporation under the tradename CSX-440L™; 0.025 gram of poly(ethylene glycol), $M_w$=18.5K, available from Polysciences; 0.05 gram of N-lauroyl sarcosine available from Sigma Chemicals Company; 2.5 grams of a premixed Trizma buffer (pH=8.5) available from Sigma Chemicals Company; 4.38 grams of ethyleneglycol available from Aldrich; 4.38 grams of diethyleneglycol available from Aldrich; 0.25 gram of N,N'-bis(3-aminopropyl ethylenediamine; and 25.13 grams of deionized water. The pH of the ink was then adjusted to 9.00+/-0.02 by the addition of dilute (3M) hydrochloric acid. The viscosity of this ink is reported in Table 1. This ink was printed on an HP 850C printer (black cartridge) to provide images of 1.5 optical density on Image Series LX and Xerox 4024DP papers. The images were found to be about 95 percent waterfast, using the measurement technique described in Example I.

EXAMPLE V (27039-64-9) ([N-Baped=1.0 Percent):

A total of 50 milliliters of ink was prepared by mixing in a 100 milliliter glass bottle 12.5 grams of a 20 percent by weight carbon black (pH=7.8) dispersion available from Cabot Corporation under the tradename CSX-440L™; 0.025 gram of poly(ethylene glycol), $M_w$=18.5K, available from Polysciences; 0.05 gram of N-lauroyl sarcosine available from Sigma Chemicals Company; 2.5 grams of a premixed Trizma buffer (PH=8.5) available from Sigma Chemicals Company; 2.5 grams of ethyleneglycol available from Aldrich; 2.5 grams of diethyleneglycol available from Aldrich; 0.5 grams of N,N'-bis(3-aminopropyl ethylenediamine; and 28.13 grams of deionized water. The pH of the ink was then adjusted to 9.00+/-0.02 by the addition of dilute (3M) hydrochloric acid. The viscosity of this ink is reported in Table 1.

This ink was printed on an HP 850C printer (black cartridge) to provide images of 1.5 optical density on Image Series LX and Xerox 4024DP papers. The images were found to be about 96 percent waterfast, using the measurement technique described in Example I.

COMPARATIVE EXAMPLE (27039-64-11) (Control, no N-Baped):

An ink was prepared by mixing in a 100 milliliter glass bottle 12.5 grams of a 20 percent by weight carbon black dispersion (carbon black pH=7.8) available from Cabot Corporation under the tradename CSX-440L™; 0.025 gram of poly(ethylene glycol), $M_w$=18.5K, available form Polysciences; 0.05 gram of N-lauroyl sarcosine available from Sigma Chemicals Company; 2.5 grams of a premixed Trizma buffer (pH=8.5) available from Sigma Chemicals Company; 4.38 grams of ethyleneglycol available from Aldrich; 4.38 grams of diethyleneglycol available from Aldrich; and 25.96 grams of deionized water. The pH of the ink was then adjusted to 9.00+/-0.02 by the addition of dilute (3M) hydrochloric acid. The viscosity of this ink is reported in Table 1 below.

This ink was printed on an HP 850C printer (black cartridge) to provide images of 1.5 optical density on both Image LX and Xerox 4024 DP papers. The images were found to be about 80 percent waterfast, using the measurement technique described in Example I.

The rheological characterization, or viscosity was accomplished on a Carri-Med CSL100 controlled stress rheometer using the standard-size double concentric cylinder geometry. The gap was maintained at 500 micrometers and the rotor was lowered using the autogap system. The sample volume was 3.5 milliliters and, for consistency, it was measured with an Eppendorff pipette. The tests were based on shear stress or shear rate sweeps in the linear mode at a constant temperature of 35° C. For the stress sweeps, the end stress value was always adjusted to reach a shear rate of approximately 2,000 s$^{-1}$. The procedure included a preshear period of 1 second at a low stress level (10 to 30 dynes/cm$^2$) and an equilibration time of 10 seconds. The ascent and descent periods were 2 minutes each with a holding time of 30 seconds at the maximum shear stress/shear rate level.

TABLE 1

Viscosity of Inks at Varying Shear Rates

| Shear rate (s$^{-1}$) | Ex. I η (cps) for 0.05 percent BAPED | Ex. II η (cps) for 0.1 percent BAPED | Ex. III η (cps) for 0.25 percent BAPED | Ex. IV η (cps) for 0.5 percent BAPED | Ex. V η (cps) for 1.0 percent BAPED | Comp. Ex. η (cps) for 0 percent BAPED |
|---|---|---|---|---|---|---|
| 1 | 276.0 | 197.0 | 408.0 | 284.0 | 260.0 | 7.0 |
| 10 | 96.0 | 40.2 | 88.6 | 72.5 | 47.0 | 2.3 |
| 50 | 16.1 | 14.1 | 20.1 | 14.7 | 15.3 | 2.2 |
| 100 | 10.2 | 9.8 | 13.9 | 10.7 | 10.4 | 2.2 |
| 500 | 5.1 | 5.6 | 6.9 | 6.8 | 5.3 | 2.1 |
| 1,000 | 4.2 | 4.6 | 5.3 | 5.7 | 4.3 | 2.1 |
| 2,000 | 3.6 | 3.9 | 5.1 | 5.7 | 3.8 | 2.1 |

η refers to viscosity

Advantages evidenced by the above invention data include, for example, the rheological or viscosity behavior indicated herein, and imparted by interactions between the amine, N-BAPED, and the pigment, carbon black.

EXAMPLE VI

Dye Solution ([N-Baped]=0.025 Weight Percent):

A total of 50 milliliters of ink was prepared by mixing in a 100 milliliter glass bottle 12.5 grams of a 20 percent by weight dye solution le from BASF and sold under the tradename X-34; 0.025 gram of poly(ethylene glycol), $M_w$=18.5K, available from Polysciences; 0.05 gram of N-lauroyl sarcosine available from Sigma Chemicals Company; 2.5 grams of a premixed Trizma buffer (pH=8.5) available from Sigma Chemicals Company; 4.38 grams of ethyleneglycol available from Aldrich; 4.38 grams of diethyleneglycol available from Aldrich; 0.025 gram of N,N'-bis (3-aminopropyl ethylenediamine; and 26.15 grams of deionized water. The pH of the ink was then adjusted to 9.00+/-0.02 by the addition of dilute (3M) hydrochloric acid. The viscosity of this ink is reported in Table 2 below.

TABLE 2

Viscosity of Ink at Varying Shear Rates

| Shear Rate (s$^{-1}$) | Example VI η (cps) for Dye Solution 0.025 Percent N-BAPED |
|---|---|
| 1 | 3.10 |
| 10 | 2.53 |
| 50 | 2.23 |
| 100 | 2.10 |
| 500 | 2.03 |
| 1,000 | 2.00 |
| 2,000 | 2.10 |

Other embodiments and modifications of the present invention may occur to those skilled in the art subsequent to a review of the information presented herein; these embodiments, modifications, and equivalents thereof, are also included within the scope of this invention.

What is claimed is:

1. An ink composition comprised of a vehicle, an acidic pigment, and associated with said pigment, N,N'-bis (aminopropyl)ethylene diamine and which ink possesses a high viscosity prior to shearing, a low viscosity during shearing, and a high viscosity after shearing and wherein said high viscosity is from about 5 to about 200 centipoise measured at a shear rate of about 25 sec$^{-1}$, said low viscosity is from about 1 to about 10 centipoise during shearing at about 150 sec$^{-1}$. and said high viscosity is from about 5 centipoise to about 200 centipoise after shearing, and wherein pH of the ink is from about 8.8 to about 9.2.

2. An ink in accordance with claim 1 wherein said high viscosity is from about 20 to about 500 centipoise, and said low viscosity is from about 1 to about 10 centipoise, said vehicle is water, said pigment is carbon black.

3. An ink in accordance with claim 2 wherein said high viscosity is from about 50 to about 300 centipoise and said low viscosity is from about 2 to about 5 centipoise.

4. An ink in accordance with claim 1 further containing ink additives.

5. An ink in accordance with claim 4 wherein said ink additives are selected from the group consisting of a humectant, a biocide, and mixtures thereof, each present in an amount of from about 1 to about 50 weight percent.

6. An ink in accordance with claim 5 wherein the humectant is a glycol.

7. An ink in accordance with claim 1 wherein the pigment is present in an amount of about 1 to about 10 percent by weight.

8. An ink in accordance with claim 2 wherein the water is present in an amount of from about 75 to about 99.5 percent by weight.

9. An ink in accordance with claim 5 wherein the humectant is a glycol selected from the group consisting of ethylene glycol, propylene glycol, diethylene glycol, and mixtures thereof.

10. An ink in accordance with claim 1 further containing a biocide present in the amount of from about 0.02 to about 0.1 percent by weight.

11. An ink in accordance with claim 2 wherein said amine is present in an amount of from about 0.01 to about 50 weight percent of said carbon black.

12. An ink in accordance with claim 11 wherein said amount is from about 0.1 to about 5 weight percent.

13. An ink in accordance with claim 1 wherein said amine is present in an amount of from about 0.01 to about 50 weight percent.

14. A process which comprises providing an acoustic ink printer having a pool of ink with a free surface, and a printhead including at least one droplet ejector for radiating the free surface of said ink with focused acoustic radiation to eject individual droplets of ink therefrom on demand, said radiation being brought to focus with a finite waist diameter in a focal plane, and wherein said ink is comprised of a vehicle, an acidic pigment, and associated with said pigment N-bis(aminopropyl)ethylene diamine, and which ink possesses a high viscosity prior to shearing, a low viscosity during shearing, and a high viscosity after shearing, and wherein said high viscosity is from about 5 to about 200 centipoise measured at a shear rate of about 25 $sec^{-1}$. said low viscosity is from about 1 to about 10 centipoise during shearing at about 150 $sec^{-1}$, and said high viscosity is from about 5 centipoise to about 200 centipoise after shearing, and wherein said pH of the ink is from about 8.8 to about 9.2.

15. An ink composition comprised of a vehicle, an acidic pigment, and associated with said pigment N-bis (aminopropyl)ethylene diamine, and which ink possesses a high viscosity prior to shearing, a low viscosity during shearing, and a high viscosity after shearing, and wherein said high viscosity is from about 5 to about 200 centipoise measured at a shear rate of about 25 $sec^{-1}$, said low viscosity is from about 1 to about 10 centipoise during shearing at about 150 $sec^{-1}$, and said high viscosity is from about 5 centipoise to about 200 centipoise after shearing, and wherein pH of the ink is from about 8.8 to about 9.2.

* * * * *